United States Patent
Roberson et al.

(10) Patent No.: US 10,641,084 B2
(45) Date of Patent: May 5, 2020

(54) CONTRAST ENHANCEMENT AGENTS FOR SUBTERRANEAN TREATMENT FLUIDS

(71) Applicant: Halliburton Energy Services, Inc., Houston, TX (US)

(72) Inventors: Mark Roberson, Cary, NC (US); Scott Goodwin, Chapel Hill, NC (US)

(73) Assignee: Halliburton Energy Services, Inc., Houston, TX (US)

( * ) Notice: Subject to any disclaimer, the term of this patent is extended or adjusted under 35 U.S.C. 154(b) by 119 days.

(21) Appl. No.: 15/752,954

(22) PCT Filed: Sep. 18, 2015

(86) PCT No.: PCT/US2015/050980
§ 371 (c)(1),
(2) Date: Feb. 15, 2018

(87) PCT Pub. No.: WO2017/048282
PCT Pub. Date: Mar. 23, 2017

(65) Prior Publication Data
US 2018/0238168 A1   Aug. 23, 2018

(51) Int. Cl.
*E21B 33/13* (2006.01)
*E21B 47/10* (2012.01)
(Continued)

(52) U.S. Cl.
CPC ............ *E21B 47/102* (2013.01); *C04B 28/02* (2013.01); *C09K 8/03* (2013.01); *C09K 8/40* (2013.01);
(Continued)

(58) Field of Classification Search
CPC .......... E21B 47/09; E21B 47/10; E21B 33/13; C09K 8/42
See application file for complete search history.

(56) References Cited

U.S. PATENT DOCUMENTS 3,565,533 A    2/1971  Garcia et al.
4,691,774 A *  9/1987  Nelson ................ B01F 13/0809
                                              106/811
(Continued)

FOREIGN PATENT DOCUMENTS

WO    2013123207 A2    8/2013
WO    2014/165314 A2   10/2014

OTHER PUBLICATIONS

Search Report issued in related French patent application No. 1657542, dated Feb. 15, 2019, 16 pages.
(Continued)

*Primary Examiner* — Kenneth L Thompson
(74) *Attorney, Agent, or Firm* — Thomas Rooney; Baker Botts L.L.P.

(57) ABSTRACT

Systems and methods for detecting or monitoring treatment fluids in subterranean formations are provided. In certain embodiments, the methods comprise: providing an enhanced treatment fluid that comprises at least a base fluid and one or more contrast enhancement agents, which may include dielectric materials, magnetic materials, dispersive materials, and/or any combination thereof; and introducing the enhanced treatment fluid into at least a portion of a well bore penetrating a portion of a subterranean formation in the course of certain operations in the well bore.

13 Claims, 2 Drawing Sheets

(51) Int. Cl.
| | |
|---|---|
| *C09K 8/42* | (2006.01) |
| *E21B 47/12* | (2012.01) |
| *C09K 8/467* | (2006.01) |
| *C04B 28/02* | (2006.01) |
| *C09K 8/03* | (2006.01) |
| *C09K 8/40* | (2006.01) |
| *C09K 8/504* | (2006.01) |
| *C09K 8/74* | (2006.01) |
| *E21B 33/14* | (2006.01) |
| *C04B 111/00* | (2006.01) |
| *E21B 21/08* | (2006.01) |
| *E21B 43/04* | (2006.01) |
| *E21B 43/26* | (2006.01) |

(52) U.S. Cl.
CPC .............. *C09K 8/467* (2013.01); *C09K 8/504* (2013.01); *C09K 8/74* (2013.01); *E21B 33/13* (2013.01); *E21B 33/14* (2013.01); *E21B 47/122* (2013.01); *C04B 2111/00422* (2013.01); *E21B 21/08* (2013.01); *E21B 43/04* (2013.01); *E21B 43/26* (2013.01)

(56) References Cited

U.S. PATENT DOCUMENTS

| | | | | |
|---|---|---|---|---|
| 7,712,527 | B2 | 5/2010 | Roddy | |
| 8,162,050 | B2* | 4/2012 | Roddy | E21B 33/13 166/250.14 |
| 8,162,055 | B2* | 4/2012 | Lewis | C04B 28/02 166/177.4 |
| 8,291,975 | B2* | 10/2012 | Roddy | E21B 47/01 166/250.1 |
| 8,297,352 | B2* | 10/2012 | Roddy | E21B 33/13 166/250.01 |
| 8,297,353 | B2* | 10/2012 | Roddy | E21B 33/13 166/250.14 |
| 8,302,686 | B2* | 11/2012 | Roddy | E21B 33/13 166/250.01 |
| 8,316,936 | B2* | 11/2012 | Roddy | E21B 43/25 166/253.1 |
| 8,342,242 | B2* | 1/2013 | Roddy | E21B 33/13 166/255.1 |
| 9,194,207 | B2* | 11/2015 | Roddy | E21B 47/01 |
| 9,200,500 | B2* | 12/2015 | Roddy | E21B 33/13 |
| 9,394,756 | B2* | 7/2016 | Roberson | E21B 33/13 |
| 9,394,784 | B2* | 7/2016 | Roberson | E21B 33/13 |
| 9,394,785 | B2* | 7/2016 | Goodwin | E21B 33/13 |
| 2009/0087912 | A1 | 4/2009 | Ramos et al. | |
| 2013/0118733 | A1 | 5/2013 | Kumar | |
| 2013/0213647 | A1 | 8/2013 | Roddy et al. | |
| 2014/0111349 | A1 | 4/2014 | Roberson et al. | |
| 2014/0213488 | A1 | 7/2014 | Jamison | |
| 2014/0367092 | A1 | 12/2014 | Roberson et al. | |
| 2017/0137687 | A1* | 5/2017 | Rodney | E21B 33/13 |

OTHER PUBLICATIONS

International Preliminary Report on Patentability issued in related PCT Application No. PCTUS2015/050980 dated Mar. 29, 2018 (8 pages).
Nalwa, H. S. "Handbook of Low and High Dielectric Constant Materials and their Applications, 1999." (Tables of Contents).
Holderfield, Sonya P., and J. B. Salsman. "Observed trends in the dielectric properties of minerals at elevated temperatures." MRS Online Proceedings Library Archive 269 (1992).
Rosenholtz, Joseph L., and Dudley T. Smith. The dielectric constant of mineral powders. Troy, NY: Rensselaer Polytechnic Institute, 1936.
Wikipedia entry for Low-k dielectric found at https://en.wikipedia.org/wiki/Low-%CE%BA_dielectric, 3 pages.
Wikipedia entry for High-k dielectric found at https://en.wikipedia.org/wiki/High-%CE%BA_dielectric, 4 pages.
International Search Report and Written Opinion issued in related PCT Application No. PCT/US2015/050980 dated Jun. 17, 2016, 12 pages.
Official action issued in related Canadian patent application No. 2987028, dated Oct. 11, 2018, 4 pages.

* cited by examiner

US 10,641,084 B2

CONTRAST ENHANCEMENT AGENTS FOR SUBTERRANEAN TREATMENT FLUIDS

CROSS-REFERENCE TO RELATED APPLICATION

The present application is a U.S. National Stage Application of International Application No. PCT/US2015/050980 filed Sep. 18, 2015, which is incorporated herein by reference in its entirety for all purposes.

BACKGROUND

The present disclosure relates to systems and methods for treating subterranean formations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, drilling operations, cementing operations, fracturing operations, gravel packing operations, acidizing operations, scale dissolution and removal, consolidation operations, and the like.

Various techniques exist for detecting, monitoring, and tracking treatment fluids and/or other fluids in subterranean formations and well bores. For example, such fluids may be detected using optical signals, electromagnetic fields or signals, seismic activity, acoustic signals, and/or other phenomena affected by the presence of the fluids in a formation. However, most of these detection techniques are inherently limited by the sensitivity of the equipment used and the strength of the signals they detect in the formation. Such techniques may be further limited by natural phenomena in the formation that may interfere with or obscure the signals and methods of detection used therein.

BRIEF DESCRIPTION OF THE DRAWINGS

These drawings illustrate certain aspects of some of the embodiments of the present disclosure, and should not be used to limit or define the claims.

Figure 1:
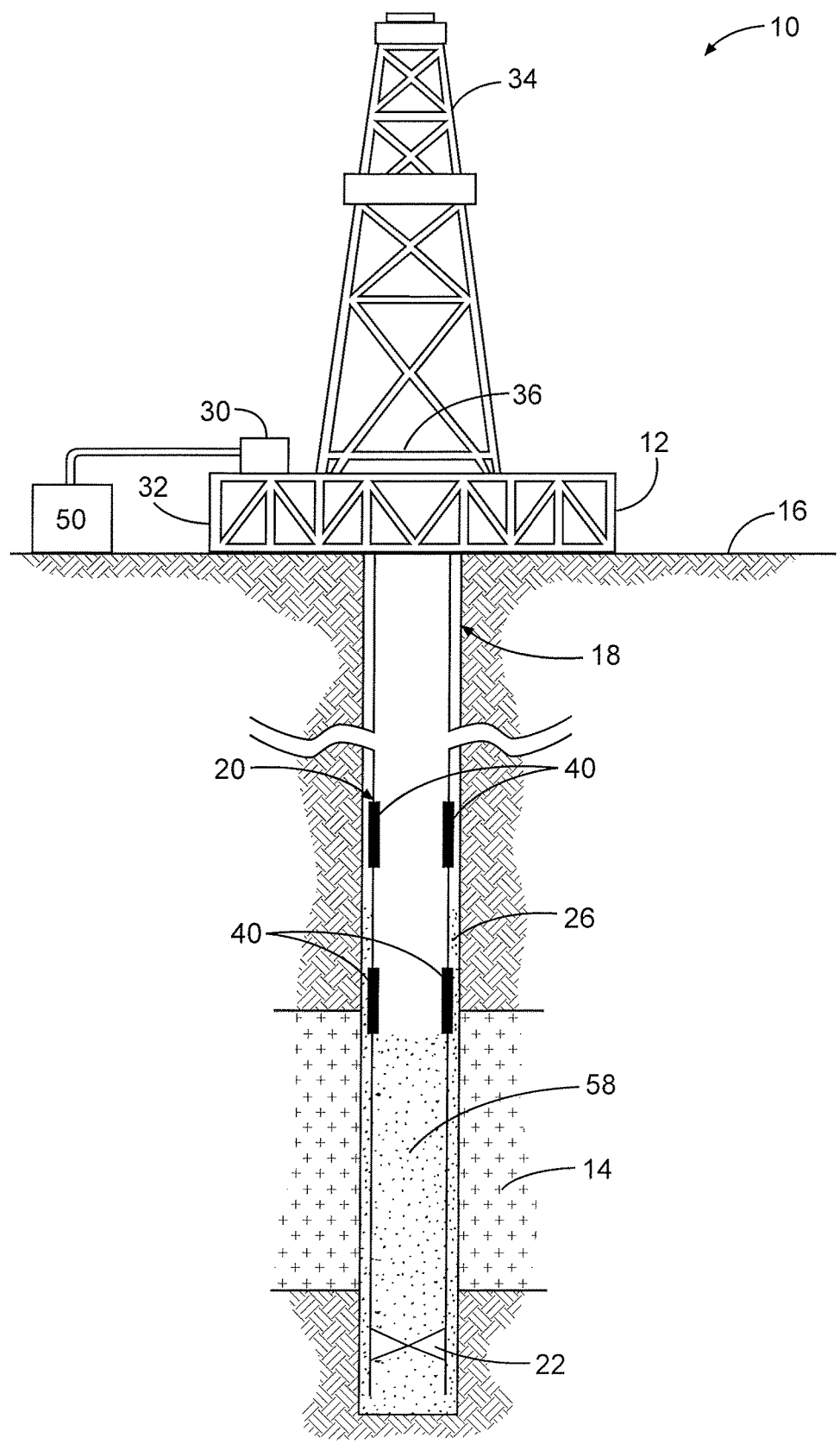
FIG. 1 is a diagram illustrating an example of a cementing treatment system at a well site according to certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating subterranean formations. More particularly, the present disclosure relates to systems and methods for detecting or monitoring treatment fluids in subterranean formations.

The present disclosure provides methods and systems for enhancing the ability to detect, monitor, and/or differentiate treatment fluids placed in a subterranean formation in the course of one or more treatments or operations therein. In particular, the treatment fluids of the present disclosure comprise or use one or more contrast enhancement agents. These contrast enhancement agents may provide (and, in some embodiments, may be selected for their ability to provide), for example, dielectric enhancement, magnetic enhancement, or dispersive structures that allow the position of a fluid in the formation to be detected with greater clarity than the fluid without such agents. The methods of the present disclosure comprise: providing an enhanced treatment fluid that comprises at least a base fluid and one or more contrast enhancement agents; and introducing the enhanced treatment fluid into at least a portion of a well bore penetrating a subterranean formation. In certain embodiments, the position and/or other properties (e.g., additive concentration) of the enhanced fluid may be monitored, detected, and/or tracked using a system comprising a processor and equipment (e.g., transceivers) that is configured to detect one or more signals from the enhanced treatment fluid.

Among the many potential advantages to the methods and compositions of the present disclosure, only some of which are alluded to herein, the methods, compositions, and systems of the present disclosure may enable more effective and/or accurate monitoring of treatment fluids and/or materials carried in such fluids in a subterranean formation and/or well bore. In certain embodiments, such improvements in the effectiveness and/or accuracy of the fluid monitoring may be achieved without significant modifications to equipment used in conventional monitoring techniques (although in other embodiments such equipment may be modified to account for particular contrast enhancement agents).

The enhanced treatment fluids used in the methods and systems of the present disclosure may comprise any treatment fluid used for subterranean treatments and/or operations, including but not limited to drilling fluids (sometimes referred to as "drilling muds"), pre-flush fluids, after-flush fluids, spacer fluids, fracturing fluids, packer fluids, gravel packing fluids, acidizing fluids, sealant compositions, cementing compositions/fluids, clean-out fluids, workover fluids, completion fluids, fluid pills, and the like. In certain embodiments, such treatment fluids comprise a base fluid and one or more optional additives. The base fluids may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of the fluid such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, organic liquids, and the like. In certain embodiments, the treatment fluids may comprise a mixture of one or more liquids, gases, and/or solids, including but not limited to emulsions, foams, slurries, suspensions, and the like.

In certain embodiments, the treatment fluids used in the methods and systems of the present disclosure optionally may comprise any number of additional additives. Examples of such additional additives include, but are not limited to, cementitious materials, salts, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after a viscosifying agent has been at least partially hydrated in the fluid. A person skilled in the art, with the benefit of this disclosure, will recognize the types of additives that may be included in the fluids of the present disclosure for a particular application.

In certain embodiments of the present disclosure, the enhanced treatment fluid may comprise a cementing fluid that comprises a cementitious material or combination thereof. A variety of cementitious materials may be utilized in these compositions, including, but not limited to, hydraulic cements that set and harden by reaction with water. Such cements may contain a variety of elements including calcium, aluminum, silicon, oxygen, and/or sulfur. For example, suitable cements may include Portland cements, pozzolana cements, gypsum cements, high-alumina-content cements, slag cements, fly ash, and silica cements, among others, and combinations thereof. In certain exemplary embodiments, the cement may include a Portland cement. In some embodiments, the Portland cements that are suited for use in the present techniques are classified as Class A, C, H, and G cements according to American Petroleum Institute, *API Specification for Materials and Testing for Well Cements*, API Specification 10, Fifth Ed., Jul. 1, 1990. In addition to the cementitious material, a cementing fluid of the present disclosure may include additional additives suitable for cementing fluids used in subterranean operations, including but not limited to set retarders, weighting agents, and the like.

The contrast enhancement agents in the enhanced treatment fluids of the present disclosure generally comprise a solid material that, when suspended in a treatment fluid, alters the inherent properties (e.g., dielectric constant, magnetic properties, electromagnetic properties, etc.) of the fluid. Such contrast enhancement agents may comprise one or more dielectric materials (e.g., materials having a higher or lower dielectric constant than the fluid), magnetic materials, dispersive materials (e.g., materials having dielectric properties that vary when exposed to electromagnetic waves over a certain range of frequencies), or any combination thereof. In certain embodiments, the contrast enhancement agents may comprise one or more of the aforementioned materials that is deposited or coated onto another substrate material or particulate (e.g., a proppant particulate) suspended in the treatment fluid.

When dielectric materials are used as contrast enhancement agents of the present disclosure, in certain embodiments, such materials may have a dielectric constant ($\kappa$) that is higher or lower than the treatment fluid or another reference material. For example, in certain embodiments, where the treatment fluid has a low dielectric constant, a high dielectric material may be used. On the other hand, in certain embodiments, where the treatment fluid has a high dielectric constant, a low dielectric material may be used.

Examples of high dielectric materials that may be suitable for use in the methods and systems of the present disclosure include but are not limited to barium titanate, hafnium silicate, zirconium silicate, hafnium dioxide, zirconium dioxide, and any combination thereof. Examples of low dielectric materials that may be suitable for use in the methods and systems of the present disclosure include but are not limited to silicon dioxide, carbon- or fluorine-doped silicon dioxide, porous silicon dioxide, polyimide, polynorbornenes, benzocyclobutene, polytetrafluoroethylene (PTFE), hydrogen silsesquioxane (HSQ), methylsilsesquioxane (MSQ), and any combination thereof. In certain embodiments, the dielectric materials may be provided in discrete particles. In certain embodiments, such particles of dielectric materials may have particle sizes of from about 1 μm to about 1 mm in diameter. In other embodiments, the dielectric materials may be provided as an aggregate, for example, of nanoparticles held together by an agglomerating material, such as a resin or tackifying agent.

When magnetic materials are used as contrast enhancement agents of the present disclosure, in certain embodiments, such materials may comprise a variety of magnetized or unmagnetized ferrous materials. Examples of magnetic materials that may be suitable in certain embodiments of the present disclosure include, but are not limited to iron filings, nickel particles, and any combination thereof.

When dispersive materials are used as contrast enhancement agents of the present disclosure, such materials may comprise any material having dielectric properties that vary over a range of frequencies. In certain embodiments, dispersive materials may be useful in distinguishing an enhanced treatment fluid of the present disclosure from other materials in the formation that have the same dielectric constant as the material in the enhanced fluid at a particular frequency but not at other frequencies. The frequency ranges of variance used in accordance with the present disclosure may comprise any range (e.g., about 10 kHz to about 20 GHz, about 10 MHz to about 1 GHz, about 10 kHz to about 1 MHz). Examples of dispersive materials that may be suitable in certain embodiments of the present disclosure include, but are not limited to semiconductor materials, highly hydrated materials, and any combination thereof.

The contrast enhancement agents may be present in the enhanced treatment fluids of the present disclosure in any amount sufficient to alter the inherent electromagnetic and/or dielectric properties of the fluid sufficiently to be detected that does not adversely impact the other desired properties of the fluid itself. In certain embodiments, the contrast enhancement agents may be present in the enhanced treatment fluids of the present disclosure in an amount of from about 0.01% to about 50% by weight. In certain embodiments, the contrast enhancement agents may be present in the enhanced treatment fluids of the present disclosure in an amount of from about 0.01% to about 20% by weight. In certain embodiments, the contrast enhancement agents may be present in the enhanced treatment fluids of the present disclosure in an amount of from about 0.1% to about 10% by weight.

The enhanced treatment fluids of the present disclosure may be prepared using any suitable method and/or equipment (e.g., blenders, mixers, stirrers, etc.) known in the art at any time prior to their use. The enhanced treatment fluids may be prepared at least in part at a well site or at an offsite location. In certain embodiments, the contrast enhancement agents and/or other components of the enhanced treatment fluid may be metered directly into a base treatment fluid to form an enhanced treatment fluid. In certain embodiments, the base fluid may be mixed with the contrast enhancement agents and/or other components of the enhanced treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the enhanced treatment fluids of the present disclosure may be prepared, either in whole or in part, at an offsite location and transported to the site where the treatment or operation is conducted. In introducing an enhanced treatment fluid of the present disclosure into a portion of a subterranean formation and/or well bore, the components of the enhanced treatment fluid may be mixed together at the surface and introduced into the well bore together, or one or more components may be introduced into the well bore at the surface separately from other components such that the components mix or intermingle in a portion of the formation or well bore to form an enhanced treatment fluid. For example, in some embodiments, a small reservoir of a contrast enhancement agent may be positioned in a location downhole (e.g., in a piece of downhole equipment such as a float shoe), and the contrast enhancement agent therein may be injected into a treatment fluid flowing downhole at a certain point in time. In certain of these embodiments, only a select volume of the treatment fluid may be mixed with the contrast enhancement to form an enhanced treatment fluid. In any of the circumstances mentioned above, the enhanced treatment fluid is deemed to be introduced into at least a portion of the subterranean formation and/or well bore for purposes of the present disclosure.

The enhanced treatment fluids of the present disclosure may be detected, monitored, and/or tracked using any suitable equipment known in the art for detecting and/or receiving signals and/or fields that may be emitted, reflected, or altered by a treatment fluid and/or one or more components thereof. Such equipment may include data interrogating equipment, formation resistivity/conductivity sensors (or arrays thereof), formation dielectric constant sensors (or arrays thereof), acoustic (e.g., distributed acoustic sensing (DAS)) equipment, pulsed neutron equipment, fiber optic equipment, distributed temperature sensing (DTS) equipment, seismic monitoring equipment, network communications equipment, radio frequency (RF) equipment (e.g., RF electrodes), and the like. Such equipment may be placed anywhere at or near the well site where the enhanced treatment fluid is used, either at the surface or in one or more downhole locations. For example, in certain embodiments, the equipment may be installed on a downhole tool or other downhole equipment (e.g., wireline, slickline, workstring, casing string, etc.) and placed in a well bore and/or other portion of a subterranean formation, either permanently or temporarily. In certain embodiments, the equipment may comprise and/or communicate with one or more data processors such as a programmable logic controller (PLC) or a suitably programmed computer processor, etc., and a memory in which software and/or other executable instructions may be stored for operating the monitoring equipment and/or other components of the system.

The methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with a treatment system 10 at a well site according to one or more embodiments.

FIG. 1 is a diagram showing a typical onshore oil or gas drilling rig and wellbore, which will be used to clarify the methods of the present disclosure, with the understanding that the present disclosure is likewise applicable to offshore rigs and wellbores. Rig 12 is centered over a subterranean oil or gas formation 14 located below the earth's surface 16. Rig 12 includes a work deck 32 that supports a derrick 34. Derrick 34 supports a hoisting apparatus 36 for raising and lowering pipe strings such as casing 20. Pump 30 is capable of pumping a variety of wellbore compositions (e.g., drilling fluid or cement) into the well and includes a pressure measurement device that provides a pressure reading at the pump discharge. Pump 30 may convey fluids from a pump and blender system 50 at the well site. Pump and blender system 50 may comprise one or more base fluid sources, additive sources (e.g., gelling agents, proppants, MEMS sensors, and/or other components mixed into the treatment fluid), valves, metering devices, and blenders or other mixing devices that may be used to prepare an enhanced treatment fluid of the present disclosure.

Wellbore 18 has been drilled through the various earth strata, including formation 14. Although wellbore 18 is shown as vertical, the wellbore 18 may include horizontal, vertical, slant, curved, and other types of well bore geometries and orientations. Upon completion of wellbore drilling, casing 20 is often placed in the wellbore 18 to facilitate the production of oil and gas from the formation 14. Casing 20 is a string of pipes that extends down wellbore 18, through which oil and gas will eventually be extracted. A cement or casing shoe 22 is typically attached to the end of the casing string when the casing string is run into the wellbore. Casing shoe 22 guides casing 20 toward the center of the hole and minimizes problems associated with hitting rock ledges or washouts in wellbore 18 as the casing string is lowered into the well. Casing shoe, 22, may be a guide shoe or a float shoe, and typically comprises a tapered, often bullet-nosed piece of equipment found on the bottom of casing string 20. Casing shoe, 22, may be a float shoe fitted with an open bottom and a valve that serves to prevent reverse flow, or U-tubing, of cement slurry from annulus 26 into casing 20 as casing 20 is run into wellbore 18. The region between casing 20 and the wall of wellbore 18 is known as the casing annulus 26. To fill up casing annulus 26 and secure casing 20 in place, casing 20 is usually "cemented" in wellbore 18, which is referred to as "primary cementing."

In the embodiment shown, a series of monitoring tools 40 are installed on the outside of casing 20 such that they are located in the annulus 26 when the casing string 20 is placed in the wellbore 18. Tools 40 may comprise one or more electrodes that can generate electromagnetic signals and are connected to a control system (not shown) either at the surface 16 at the well site or at a remote location. Tools 40 also may comprise one or more receiver elements or sensors that are capable of detecting electromagnetic signals. A plurality of electrode tools 40 may be disposed at several locations along the length of casing string 20 in certain embodiments of the present disclosure.

In certain embodiments, the systems and methods of this disclosure may be used for monitoring primary cement during and/or subsequent to a conventional primary cementing operation. In this primary cementing embodiment, an enhanced cementing fluid of the present disclosure 58 may be prepared in pump and blender system 50 and then pumped down the inside of casing 20. As the enhanced cementing fluid 58 reaches the bottom of casing 20, it flows out of casing 20 and into casing annulus 26 between casing 20 and the wall of wellbore 18. As enhanced cementing fluid 58 flows up annulus 26, it displaces any fluid in the wellbore. To ensure no cement remains inside casing 20, devices called "wipers" (not shown) may be pumped by a wellbore servicing fluid (e.g., drilling mud) through casing 20 behind the cement 58. The wiper contacts the inside surface of casing 20 and pushes any remaining cement out of casing 20. When enhanced cementing fluid 58 reaches the earth's surface 16, and annulus 26 is filled with enhanced cementing fluid 58, pumping is terminated and the cement is allowed to set.

The monitoring tools 40 may be used to determine one or more parameters during placement and/or setting of the cement in the annulus 26. In certain embodiments, the electrodes generate electromagnetic signals at a single frequency or a range of frequencies, and then detect the electromagnetic signals that are reflected back by fluids and/or other materials in the region of electrode tool 40. The dielectric, magnetic, and/or dispersive properties of an enhanced cementing fluid 58 and/or other fluids (e.g., drilling muds) surrounding or near the electrodes in tool 40 may influence the detected signals. The presence and/or location of enhanced cementing fluid 58 and/or the shape of the portion of well bore 18 in which it resides may be determined by measuring how electromagnetic signals transmitted by the electrodes in tool 40 are affected by enhanced cementing fluid 58. Electromagnetic signals passing through enhanced cementing fluid 58 may be affected differently (e.g., strengthened, dampened, etc.) by that fluid, for example, because it comprises materials having a higher dielectric constant than other fluids not having a high dielectric constant or than the surrounding area of subterranean formation 14. In some embodiments, transceivers in tool 40 may measure how the electromagnetic signals are affected by enhanced cementing fluid 58 when fluid 58 has a high enough dielectric constant.

In certain embodiments, utilizing an enhanced cementing fluid having a high dielectric constant may facilitate determining the presence and/or location of enhanced cementing fluid 58 and/or the shape of the portion of well bore 18 or annulus 26 in which it resides from electromagnetic signals measured by transceivers. In certain embodiments, measuring electromagnetic signals transmitted through an enhanced cementing fluid may allow for greater resolution or accuracy when determining those properties when compared to a conventional treatment fluid.

The signals detected may be communicated to one or more data analysis tools or computer systems (not shown) either at the surface 16 at the well site or at a remote location. The signals may be analyzed to determine the relative location and/or other properties of the enhanced cementing fluids and/or other fluids in the wellbore 18 and annulus 26. For example, in certain embodiments, the signals detected by tools 40 may be used to determine whether an enhanced cementing fluid 58 or enhanced spacer fluid (not shown) pumped before or after a cementing fluid has reached the locations in the wellbore 18 at which tools 40 are located and/or whether any drilling fluid (not shown) remains in the annulus 26 at those locations.

While the embodiment of the present disclosure described above relates to a typical primary cementing operation, a person of ordinary skill in the art with the benefit of this disclosure will recognize that enhanced cementing fluids of the present disclosure may be used in a similar fashion in other types of cementing operations, including but not limited to reverse primary cementing operations, remedial cementing operations, squeeze cementing operations, and the like.

In certain embodiments, the contrast enhancement agents of the present disclosure may facilitate differentiating between two fluids that have similar properties. For example, in some embodiments, a cement composition and a spacer fluid used in a cementing operation may have similar properties and thus may be difficult to distinguish between using RF signals alone. By adding one or more contrast enhancement agents of the present disclosure to one or both of the cement composition and the spacer fluid, their properties can be made more different, making them easier to distinguish using RF signals. Among other benefits, this may help operators to ensure that a primary cementing job performed in a subterranean formation using those fluids has been completed successfully (e.g., that the cement composition has completely displaced the spacer fluid such that no spacer fluid remains in a particular portion of an annulus in the subterranean formation).

Figure 2:
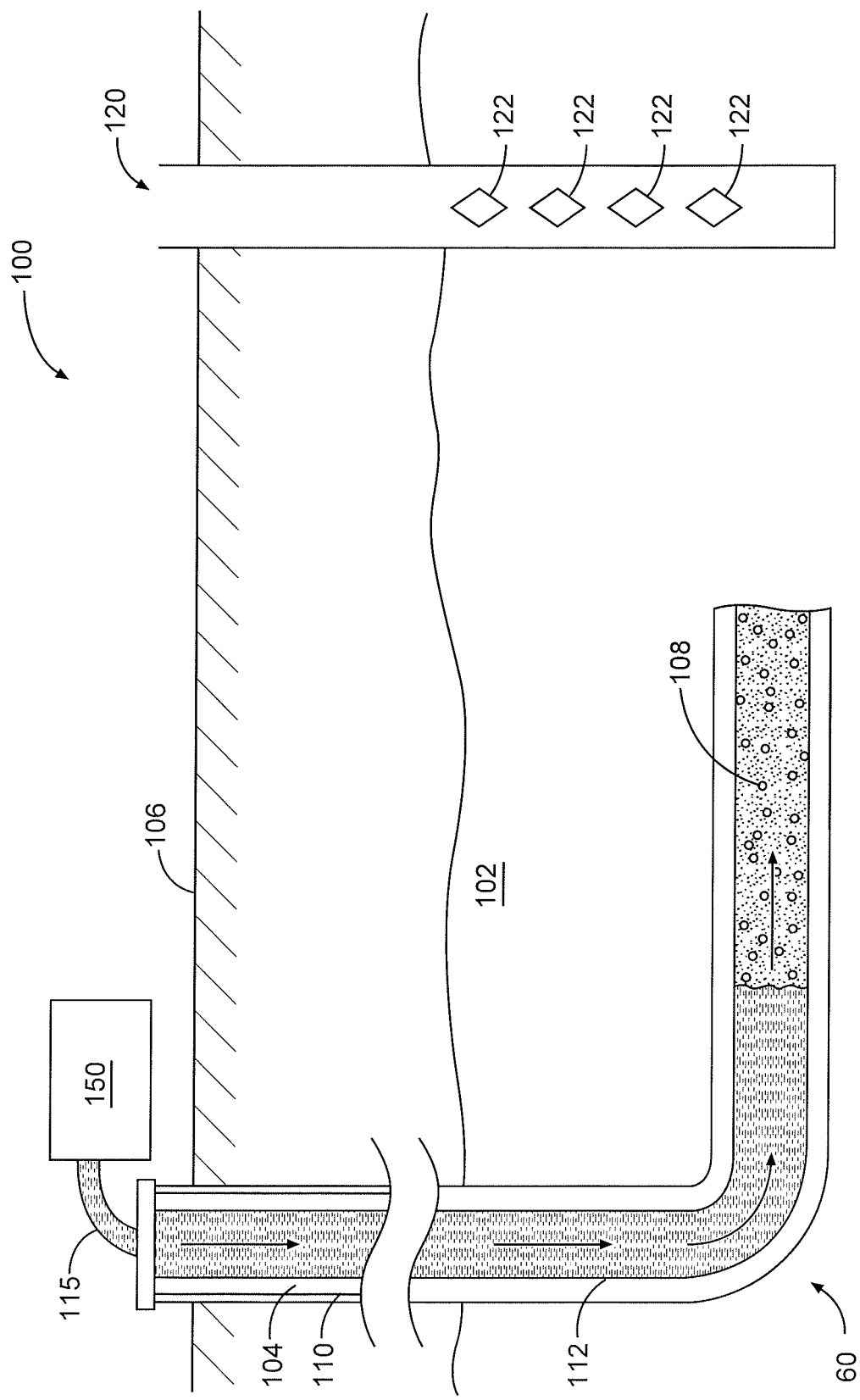
FIG. 2 is a diagram illustrating an example of a treatment system at a well site according to certain embodiments of the present disclosure.

FIG. 2 is a diagram that shows another embodiment of a treatment system 100 at a well site according to the present disclosure. In particular, FIG. 2 shows a well 60 during a treatment operation in a portion of a subterranean formation of interest 102 surrounding a well bore 104. The well bore 104 extends from the surface 106, and an enhanced treatment fluid of the present disclosure 108 that comprises one or more contrast enhancement agents is applied to a portion of the subterranean formation 102 surrounding the horizontal portion of the well bore. Another fluid 115 is pumped into the well bore 104, among other reasons, to displace the enhanced fluid 108 into the horizontal portion of the well bore. Although shown as vertical deviating to horizontal, the well bore 104 may include horizontal, vertical, slant, curved, and other types of well bore geometries and orientations, and the treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow treatment fluids and/or other materials to flow into the subterranean formation 102. In cased wells, perforations can be formed using shape charges, a perforating gun, hydro jetting and/or other tools.

A pump and blender system 150 similar to pump and blender system 50 described with respect to FIG. 1 resides at the surface at a well site where a well 60 is located, and may be used to prepare one or more treatment fluids according to the present disclosure and introduce them into well 60. The well is shown with a work string 112 descending from the surface 106 into the well bore 104. Pump and blender system 150 is coupled to work string 112 to pump fluids 108 and 115 into the well bore 104. The working string 112 may include coiled tubing, jointed pipe, and/or other structures that allow fluid to flow into the well bore 104. The working string 112 can include flow control devices, bypass valves, ports, and or other tools or well devices (not shown) that control a flow of fluid from the interior of the working string 112 into the subterranean zone 102. For example, the working string 112 may include ports adjacent the well bore wall to communicate the enhanced treatment fluid 108 directly into the subtenanean formation 102, and/or the working string 112 may include ports that are spaced apart from the well bore wall to communicate the enhanced treatment fluid 108 into an annulus in the well bore between the working string 112 and the well bore wall.

FIG. 2 also shows an observatory well 120 containing transceivers 122. Observatory well 120 may contain as few as one or as many as one hundred transceivers 122. In particular embodiments, transceivers 122 may be a fiber or cable the length of all or a portion of observatory well 120. In certain embodiments, multiple observatory wells 120 may be placed around subterranean formation 102. In certain embodiments, observatory wells 120 may be placed within 1000 meters of the well bore 104. In certain embodiments, observatory wells 120 may be placed between 200 to 300 meters of each other. Although shown as vertical, observatory well 120 may include horizontal, vertical, slant, curved, and other types of well bore geometries and orientations.

Transceivers 122 may be used to transmit and receive electromagnetic signals for use in monitoring subterranean formation 102. Transceivers 122 may be used to transmit and receive electromagnetic signals for use in, for example, determining the presence and/or location of enhanced treatment fluid 108 and/or the shape of the portion of well bore 104 in which it resides. Measuring electromagnetic signals transmitted by transceivers 122 may allow for determination of the presence and/or location of enhanced treatment fluid 108. In certain embodiments, transceivers 122 located in a signal observatory well 120 may both transmit and receive electromagnetic signals. In other embodiments, transceivers 122 in a first observatory well may transmit electromagnetic signals and transceivers 122 in a second observatory well may receive the transmitted electromagnetic signals.

Transceivers 122 may transmit and receive electromagnetic signals having frequencies ranging from 0.01 MHz to 10 GHz. The frequencies of the electromagnetic signals transmitted by transceivers 122 may affect how far the signals can be used to measure into subterranean formation 102. Electromagnetic signals having a lower frequency may allow for the signals to be measured farther into subterranean formation 102 than electromagnetic signals having a higher frequency. For example, electromagnetic signals transmitted with a frequency of 0.01 MHz may allow for measurement of up to 200 meters into subterranean formation 102, while electromagnetic signals having a frequency of 10 GHz may allow for measurement of only a few feet.

The presence and/or location of enhanced treatment fluid 108 and/or the shape of the portion of well bore 104 in which it resides may be determined by measuring how electromagnetic signals transmitted by transceivers 122 are affected by enhanced treatment fluid 108. Electromagnetic signals passing through enhanced treatment fluid 108 may be affected differently (e.g., strengthened, dampened, etc.) by that fluid, for example, because it comprises materials having a higher dielectric constant than other fluids not having a high dielectric constant or by subterranean formation 102. In some embodiments, transceivers 122 may measure how the electromagnetic signals transmitted by transceivers 122 are affected by enhanced treatment fluid 108 when enhanced treatment fluid 108 has a high enough dielectric constant. In particular embodiments, transceivers 122 may measure how the electromagnetic signals transmitted by transceivers 122 are affected by enhanced treatment fluid 108 when enhanced treatment fluid 108 has a dielectric constant greater than or equal to 150.

Utilizing an enhanced treatment fluid having a high dielectric constant may facilitate determining the presence and/or location of enhanced treatment fluid and/or the shape of the portion of well bore 104 in which it resides from electromagnetic signals measured by transceivers. In certain embodiments, measuring electromagnetic signals transmitted through an enhanced treatment fluid may allow for greater resolution or accuracy when determining those properties when compared to a conventional treatment fluid.

In certain embodiments, the contrast enhancement agents of the present disclosure may be used in conjunction with sensors or other materials placed in the treatment fluid that are used to monitor its location and/or provide other data in a subterranean formation. For example, the treatment fluids of the present disclosure optionally may comprise a plurality of micro-electro-mechanical system (MEMS) sensors, RFID sensors, or other suitable sensors that may transmit data and/or signals to a receiver at a well site.

In certain embodiments, MEMS sensors used in the methods, systems, and compositions of the present disclosure may comprise a semiconductor device with mechanical features on the micrometer scale. Such MEMS may embody the integration of mechanical elements, sensors, actuators, and electronics on a common substrate such as silicon. In certain embodiments, MEMS sensors may include mechanical elements which are movable by an input energy (electrical energy or other type of energy). In certain embodiments, a MEMS sensor may be designed to emit a detectable signal based on a number of physical phenomena, including thermal, biological, optical, chemical, and magnetic effects or stimulation. In certain embodiments, the MEMS sensors comprise an active material connected to (e.g., mounted within or mounted on the surface of) an enclosure, the active material being liable to respond to a wellbore parameter, and the active material being operably connected to (e.g., in physical contact with, surrounding, or coating) a capacitive MEMS element. In certain embodiments, the MEMS sensors may be coupled with radio frequency identification devices (RFIDs) and can thus detect and transmit parameters and/or well cement characteristic data for monitoring the cement during its service life. In certain embodiments, such sensors optionally may be coated with a protective material such as an elastomer material. A data interrogator tool comprising at least a transceiver and a memory component also may be temporarily or permanently placed in or near the subterranean formation and/or well bore where the MEMS sensors are used. The data interrogator tool may be used to transmit signals to and/or receive signals from the MEMS sensors, store data from those signals, and/or transmit data and/or other information to other devices or computer systems used to store, communicate, and/or process that data.

The present disclosure in some embodiments provides methods for using the treatment fluids to carry out a variety of subterranean treatments, including but not limited to, cementing operations, pre-flush treatments, after-flush treatments, stimulation treatments (e.g., hydraulic fracturing treatments, acidizing treatments, etc.), sand control treatments (e.g., gravel packing), "frac-pack" treatments, well bore clean-out treatments, workover treatments, drilling operations, completion operations, consolidation treatments, and other operations where a treatment fluid may be useful. In some embodiments, the enhanced treatment fluids of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation (e.g., hydraulic fracturing).

An embodiment of the present disclosure is a method comprising: providing an enhanced treatment fluid that comprises at least a base fluid and one or more contrast enhancement agents; and introducing the enhanced treatment fluid into at least a portion of a well bore penetrating a portion of a subterranean formation during a cementing operation in the well bore. Optionally, the enhanced treatment fluid is an enhanced cementing fluid that further comprises a cementitious material, which may be allowed to at least partially set in the well bore.

Another embodiment of the present disclosure is a method comprising: providing an enhanced treatment fluid that comprises at least a base fluid and one or more contrast enhancement agents selected from the group consisting of: a magnetic material; a dispersive material; and any combination thereof; and introducing the enhanced treatment fluid into at least a portion of a well bore penetrating a portion of a subterranean formation.

Another embodiment of the present disclosure is a method comprising: providing an enhanced treatment fluid that comprises at least a base fluid and one or more contrast enhancement agents; introducing the enhanced treatment fluid into at least a portion of a well bore penetrating a portion of a subterranean formation; and receiving an electromagnetic signal that is emitted by at least one component of the enhanced treatment fluid in the well bore.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing an enhanced treatment fluid that comprises at least a base fluid and one or more contrast enhancement agents, wherein the one or more contrast enhancement agents is suspended within the base fluid, wherein the one or more contrast enhancement agents are selected from the group consisting of: a dielectric material; a magnetic material; a dispersive material; and any combination thereof, wherein the one or more contrast enhancement agents is configured to alter the inherent properties of the base fluid;
introducing the enhanced treatment fluid into at least a portion of a well bore penetrating a portion of a subterranean formation during a cementing operation in the well bore;
transmitting a first electromagnetic signal into the portion of the well bore; and
receiving a second electromagnetic signal from the portion of the well bore that is affected at least in part by the one or more contrast enhancement agents in the enhanced treatment fluid.

2. The method of claim 1 wherein the first electromagnetic signal is transmitted by at least one electrode located in the well bore.

3. The method of claim 1 wherein the second electromagnetic signal is received by at least one transceiver located in the well bore.

4. The method of claim 1 wherein the first electromagnetic signal is transmitted by at least one transceiver located in an observatory well bore separate and offset from the well bore penetrating a portion of the subterranean formation.

5. The method of claim 1 wherein the second electromagnetic signal is received by at least one transceiver located in an observatory well bore separate and offset from the well bore penetrating a portion of the subterranean formation.

6. The method of claim 1 wherein the enhanced treatment fluid is an enhanced cementing fluid that further comprises a cementitious material.

7. The method of claim 6 further comprising allowing the enhanced cementing fluid to at least partially set in the well bore.

8. The method of claim 1 wherein the enhanced treatment fluid comprises one or more micro-electro-mechanical system (MEMS) sensors.

9. The method of claim 8 further comprising receiving an electromagnetic signal that is emitted by one or more of the MEMS sensors in the enhanced treatment fluid.

10. The method of claim 9 wherein the electromagnetic signal is received by at least one transceiver located in the well bore.

11. The method of claim 9 wherein the electromagnetic signal is received by at least one transceiver located in an observatory well bore separate and offset from the well bore penetrating a portion of the subterranean formation.

12. The method of claim 8 further comprising using one or more of the MEMS sensors to receive an electromagnetic signal.

13. The method of claim 12 wherein the electromagnetic signal is transmitted by at least one transceiver located in the well bore.

* * * * *